(No Model.) 3 Sheets—Sheet 1.

J. H. KONEFES.
BRICK MACHINE.

No. 307,121. Patented Oct. 28, 1884.

(No Model.)

3 Sheets—Sheet 2.

J. H. KONEFES.
BRICK MACHINE.

No. 307,121.

Patented Oct. 28, 1884.

Witnesses,
J. C. Wildman
Willis B. Magruder

Inventor,
John H. Konefes,
per Chas. H. Fowler
Attorney (No Model.) J. H. KONEFES. 3 Sheets—Sheet 3.
BRICK MACHINE.
No. 307,121. Patented Oct. 28, 1884.
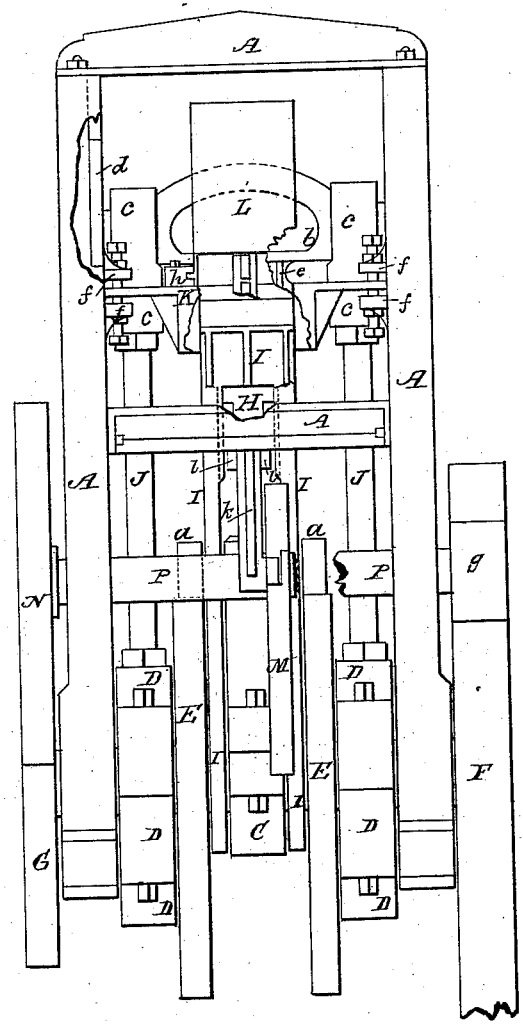
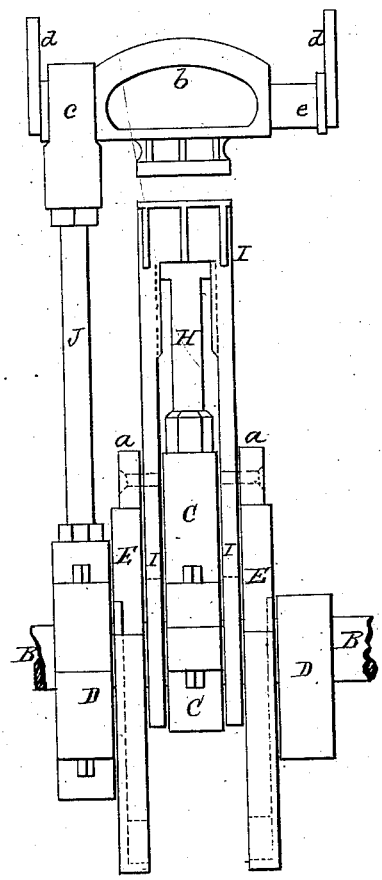

UNITED STATES PATENT OFFICE.

JOHN H. KONEFES, OF QUINCY, ILLINOIS.

BRICK-MACHINE.

SPECIFICATION forming part of Letters Patent No. 307,121, dated October 28, 1884.

Application filed May 8, 1884. (No model.)

*To all whom it may concern:*

Be it known that I, JOHN HENRY KONEFES, a citizen of the United States, residing at Quincy, in the county of Adams and State of Illinois, have invented certain new and useful Improvements in a Brick-Machine; and I do hereby declare that the following is a full, clear, and exact description of the same, reference being had to the annexed drawings, making a part of this specification, and to the letters and figures of reference marked thereon.

Figure 1:
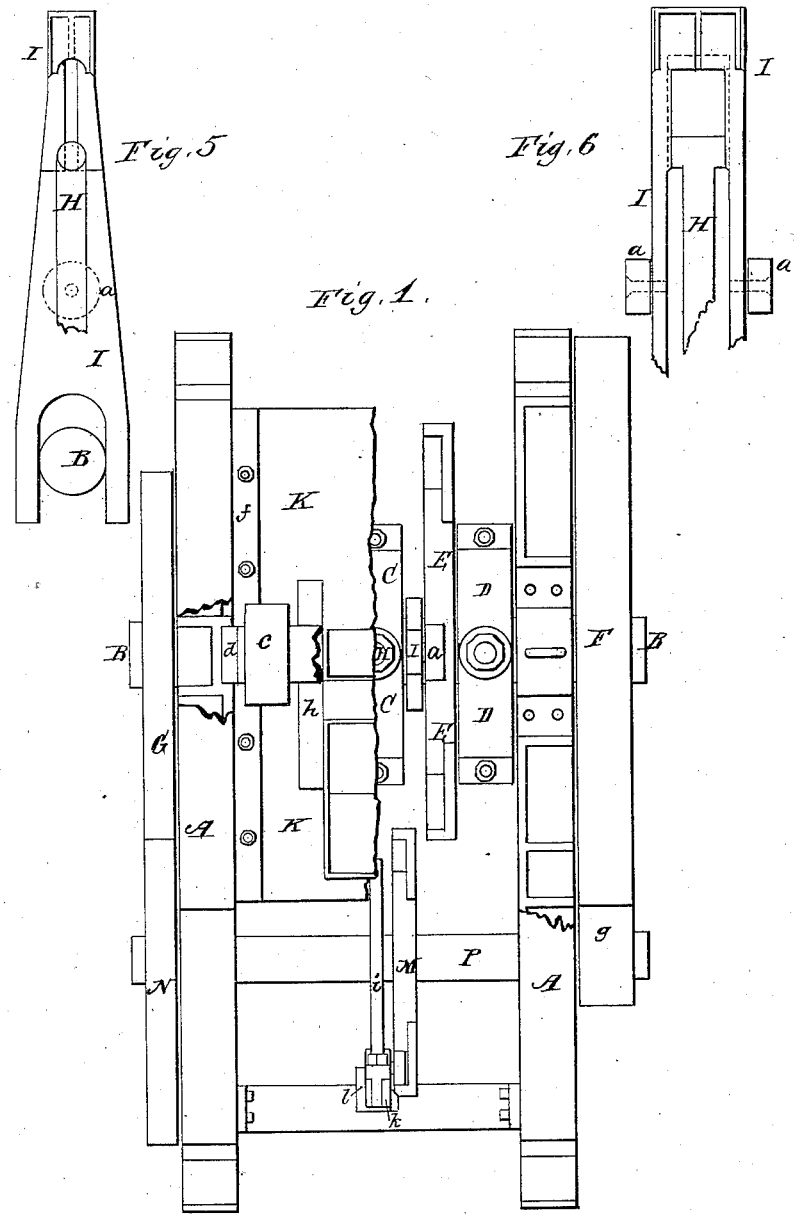
Figure 2:
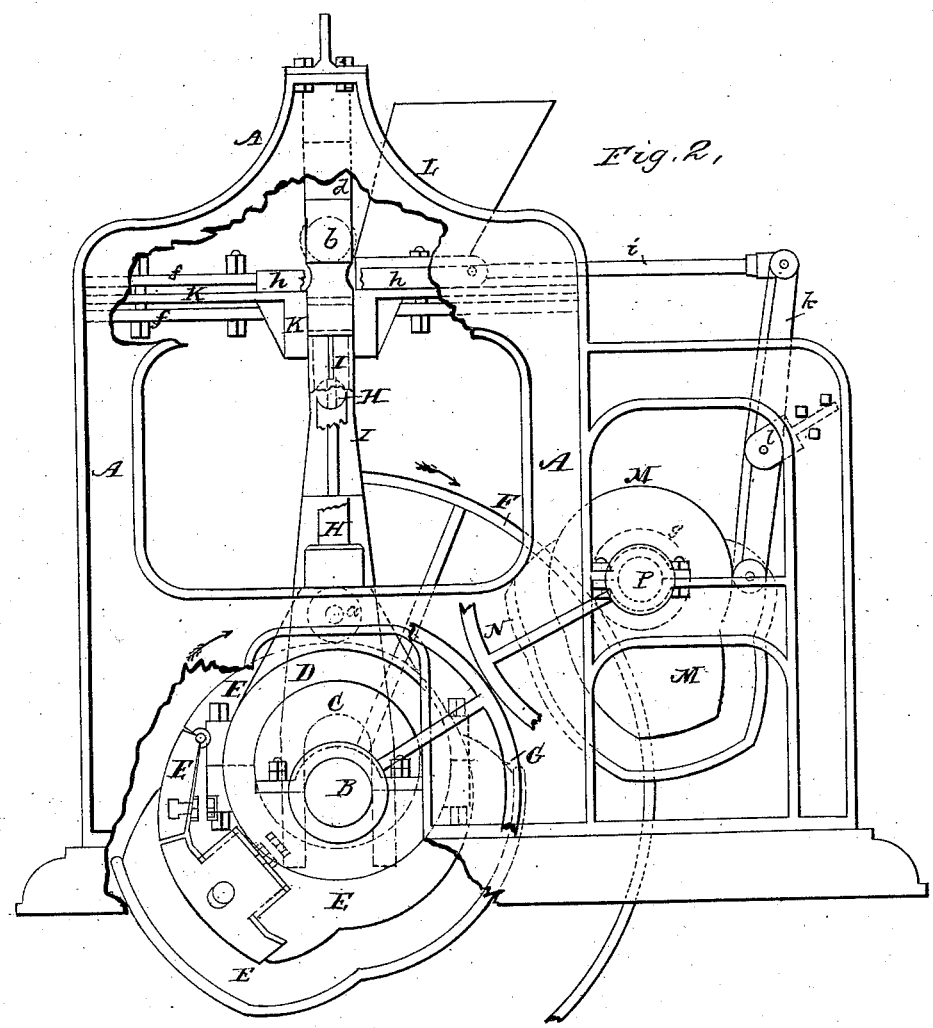

Figure 1 of the drawings represents a plan view of that portion of a brick-machine embodying my invention. Fig. 2 is a side elevation thereof, showing the frame of the machine partly broken away; Fig. 3, a rear elevation; Fig. 4, a detail view of a portion of the machine; Fig. 5, a side view in detail of the stirrup-plunger and pressing-plunger rod, and Fig. 6 a front elevation of the same.

The present invention has relation to that class of brick-machines for which a patent was granted to me February 6, 1883, No. 271,873, and is designed as an improvement thereon;
and it consists in the several details of construction, substantially as shown in the drawings, and hereinafter described and claimed.

In the accompanying drawings, A represents the frame of the machine, in which is suitably mounted a main shaft, B, carrying the eccentrics C D, cams E, and also the main gear F and gear G, which mesh, respectively, with gears $g$ and N upon a shaft, P.

Connected to the eccentric C is a T-head pressing plunger-rod, H, the head thereof working in grooves formed upon the inner sides of a plunger, I, as shown in dotted lines, Figs. 4 and 6. This plunger I, I term the "pressing and delivering plunger," the same being stirruped over and operated by the plunger-rod H and cams E.

To the sides of the stirruped portion of the plunger I are suitably-connected friction-rollers $a$, which come in contact with the periphery of the cams E when operating the plunger, as shown in Fig. 4, said plunger being bifurcated at its lower end to extend over the main shaft B, so as to guide it perpendicularly. The upper pressing-plunger is attached to a cross-head, $b$, which in turn is connected to side rods, J, by means of straps $c$, said rods at their lower ends being attached in any suitable manner to the eccentrics D. The cross-head $b$ is guided perpendicularly by guides $d$, working in grooves in the frame, said guides being bolted to journals $e$, projecting from each side of the cross-head.

Placed between suitable flanges, $f$, cast with the frame A, is the mold-table K, which is rendered adjustable by any suitable means, but preferably by set-bolts, to hold the table in its adjusted position, the object thereof being to regulate the required amount of clay used for each brick. Suitable guides, $h$, are provided for the draw-hopper L, said hopper being operated by the rod $i$, to which it is connected, also the lever $k$ and cam M, the lever being suspended by cross-bar $l$ and the cam operated by gears G N $g$, as shown in Fig. 2.

The cams E, hereinbefore referred to, are so constructed as to render them adjustable by means of a link-joint and an extension held in position by bolts, as shown in Fig. 2; but any suitable means may be employed, as found desirable. The purpose of this adjustment is to give the proper throw to raise the plunger I to the top of the mold-table, in order to effectually deliver the brick. The pressing being done by eccentrics C D, the same are set in opposite directions, and move in a direction indicated by the arrows, Fig. 2, when the eccentric C will have raised plunger H into the socket of the plunger I. The shape of cams E is such that they will follow up the throw of the eccentric C until it has reached its fulcrum, when the plunger I will be carried up, following the throw of the eccentric D until the brick has been raised out of the mold. At this point the throw of the eccentrics will remain stationary, when the cam M will move lever $k$ forward, and said lever push forward the draw-hopper L in under the plunger, at which time the cam M will remain stationary until the cam E has drawn down the stirrup-plunger I to the proper depth, which is regulated by the adjustment of the mold-table. After the stirrup-plunger I has been acted upon, as above described, the cam M will then move the draw-hopper back, and in doing so will charge the mold with clay.

Having now fully described my invention, what I claim as new, and desire to secure by Letters Patent, is—

1. In a brick-machine, the combination, with the plunger I, of the eccentrics C D and the adjustable cams E, operating substantially as and for the purpose set forth.

2. In a brick-machine, a suitable draw-hopper, L, the stirruped plunger I, and T-head plunger-rod H, in combination with an adjustable mold-table, K, substantially as and for the purpose described.

3. In a brick-machine, the plungers H I, constructed as described, and the rollers a, connected to the latter, in combination with the eccentrics C D, cams E M, and the draw-hopper L, rod i, and lever k, substantially as and for the purpose specified.

4. In a brick-machine, the eccentrics C D and cams E, constructed as described, in combination with the rods J, cross-head b, journals c, having guides d, connected thereto, and the plungers H I, of the form shown, substantially as and for the purpose set forth.

5. A brick-machine consisting of the eccentrics C D, cams E M, rods J, cross-head b, plungers H I, adjustable mold-table K, draw-hopper L, rod i, and lever k, for operating it, and the gears F G N g, constructed and arranged to operate substantially as and for the purpose described.

In testimony that I claim the above I have hereunto subscribed my name in the presence of two witnesses.

JOHN H. KONEFES.

Witnesses:
JOSEPH FAERBER,
CHARLES SCHNIEDERS.